United States Patent [19]
Westerman

[11] Patent Number: 6,005,636
[45] Date of Patent: Dec. 21, 1999

[54] SYSTEM FOR SETTING USER-ADJUSTABLE IMAGE PROCESSING PARAMETERS IN A VIDEO SYSTEM

[75] Inventor: Larry A. Westerman, Portland, Oreg.

[73] Assignee: Sharp Laboratories of America, Inc., Camas, Wash.

[21] Appl. No.: 08/828,221

[22] Filed: Mar. 27, 1997

[51] Int. Cl.[6] ................................................. H04N 5/57
[52] U.S. Cl. ...................... 348/571; 348/686; 348/687
[58] Field of Search .................... 348/686, 687, 348/649, 674, 675, 676, 677, 571; H04N 5/57, 9/64, 5/202

[56] References Cited

U.S. PATENT DOCUMENTS

| | | |
|---|---|---|
| 4,546,379 | 10/1985 | Sarofeen et al. . |
| 4,760,447 | 7/1988 | Koka et al. . |
| 5,119,178 | 6/1992 | Sakata et al. . |
| 5,231,475 | 7/1993 | Ritter et al. . |
| 5,247,358 | 9/1993 | Richards . |
| 5,305,094 | 4/1994 | Belmares-Sarabis et al. . |
| 5,311,294 | 5/1994 | Cromer et al. . |
| 5,317,401 | 5/1994 | Dupont et al. . |
| 5,333,070 | 7/1994 | Ichikawa . |
| 5,386,247 | 1/1995 | Shafer et al. . |
| 5,671,011 | 9/1997 | Kim ........................................ 348/189 |
| 5,828,351 | 10/1998 | Wu ......................................... 348/686 |

FOREIGN PATENT DOCUMENTS

| | | |
|---|---|---|
| 0524685 A2 | 1/1993 | European Pat. Off. . |
| 0091868 A1 | 10/1993 | European Pat. Off. . |
| 2503510 | 10/1982 | France . |

*Primary Examiner*—Chris Grant
*Attorney, Agent, or Firm*—Kolisch, Hartwell, Dickinson, McCormack & Heuser

[57] ABSTRACT

An image parameter adjustment system for use with a video display having a display surface area. A video image processing unit is connected to the video display and adapted to control the appearance of a video image displayed on the video display. The appearance of the image is controlled, at least in part, by the value of at least one user-adjustable display parameter. The video image processing unit includes an adjustment mode in which the image processing unit is configured to control the appearance of the video image by varying, over the display surface area, the value of the user-adjustable parameter in a range around a current value so that a viewer can see the effect that changing the value of the adjustable parameter in either direction would have on the displayed video image.

27 Claims, 2 Drawing Sheets

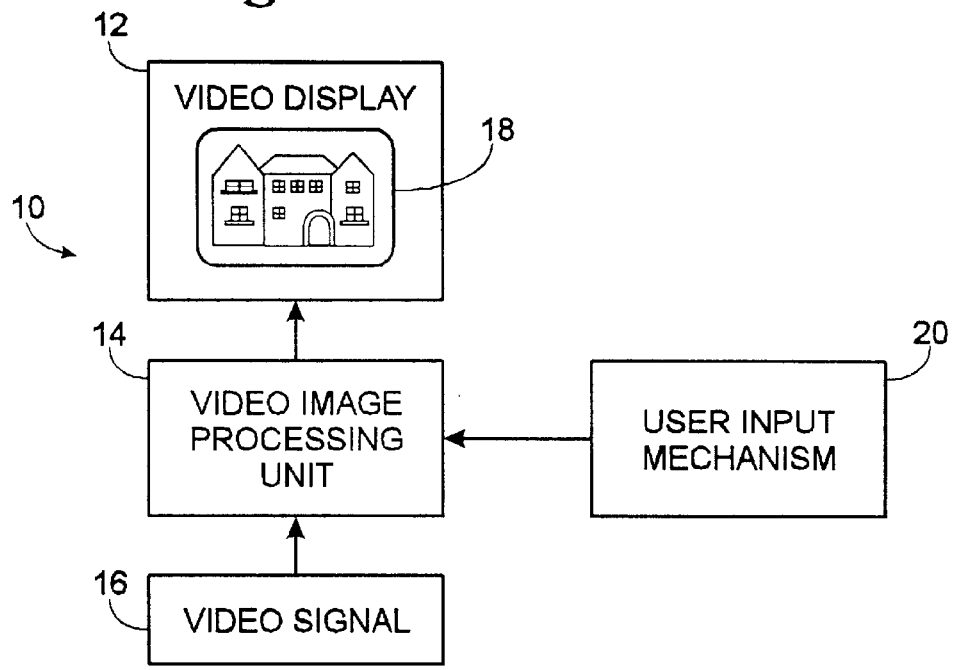
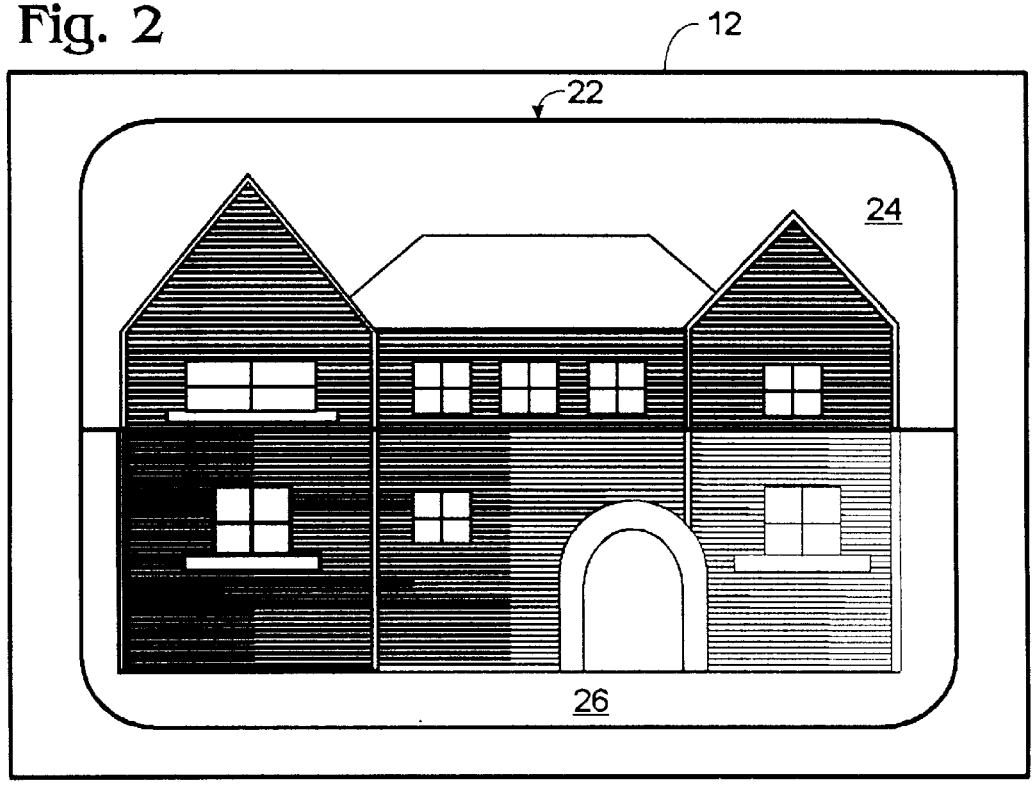

SYSTEM FOR SETTING USER-ADJUSTABLE IMAGE PROCESSING PARAMETERS IN A VIDEO SYSTEM

FIELD OF THE INVENTION

The present invention relates to a system for setting user-adjustable image processing parameters in a video system, and more particularly, to a system that presents a user with a visual indication of the effect of a change in a particular parameter prior to adjustment of the parameter.

BACKGROUND OF THE INVENTION

Most video display devices provide the user with the ability to adjust one or more picture properties or parameters to suit viewing conditions and to accommodate variations in video content. These picture properties might include brightness, contrast, hue, saturation, gamma and sharpness, among others. The user is typically able to make such adjustments using a mechanical control or through a remote control device.

One drawback with existing picture control adjustment systems is that the user cannot see what effect a particular change would have on the video image prior to making the change. Because most users have only a limited understanding of the effect of the various controls on the picture, it is relatively difficult for them to achieve a desired picture appearance. With existing adjustment systems, the image reflects only the current status of the setting with no indication of what effect a change in a particular setting would make. In addition, because there are many different image properties that can be adjusted, it is difficult for the user to select the right property to adjust, particularly in cases where more than one property must be adjusted to achieve the desired end result.

It is therefore an object of the present invention to provide a system for adjusting video image properties on a video display whereby the user is given an indication of the effect of a particular change prior to making the change.

Another object of the present invention is to provide a system for adjusting video image parameters on a video display that allows a user to adjust more than one parameter at a time.

One more object of the present invention is to provide a system for adjusting video image parameters on a video display in which different regions of the image are displayed utilizing different parameter values.

SUMMARY OF THE INVENTION

The present invention takes the form of an image parameter adjustment system for use with a video display having a display surface area. A video image processing unit is connected to the display and adapted to control the appearance of a video image presented by the display. The appearance of the image is controlled, at least in part, by the value of a user-adjustable display parameter. Typically, the processing unit includes an adjustment mode in which the processing unit is configured to control the appearance of the video image by varying, over the display surface area, the value of the user-adjustable parameter in a range around a current value so that a viewer can see the effect that changing the value of the adjustable parameter in either direction would have on the displayed video image.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE FIGURES

FIG. 1 is block diagram illustrating the structural organization of a system according to the present invention.

FIG. 2 shows a display with a video image processed with a gradated image processing parameter

DETAILED DESCRIPTION OF THE PREFERRED EMBODIMENT

Figure 3:
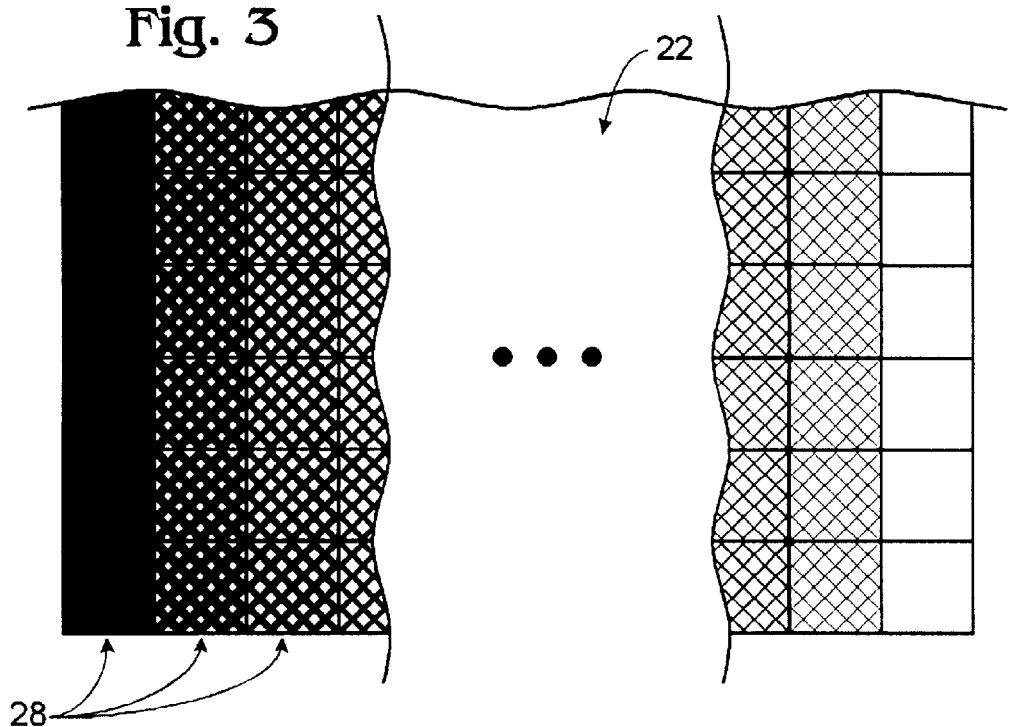
FIG. 3 is a detail view of a portion of the display of FIG. 2.

A system for setting user-adjustable image processing parameters in a video display device is shown schematically at 10 in FIG. 1. System 10 includes a video display 12 which is adapted to display a video image corresponding to a video signal. Video display 12 could be a standard TV, a computer monitor, or some other type of display. In the preferred embodiment, the display is a digital device because of the greater ease of implementing the present invention, as will be described in more detail below.

System 10 also includes a video image processing unit 14 which is connected to display 12. Processing unit 14 is adapted to process a video signal 16 to create a video image 18 for display on the video display. The video signal could come from a computer, a broadcast television transmitter, a video recorder or the like. The appearance of the video image on the display is dependent on the value of one or more user-adjustable image processing parameters.

As those of skill in the art will understand, most video displays are composed of rows and columns of pixels. Each pixel can be illuminated with various intensities and colors. The video signal carries illumination information for each pixel on the display. Because video signals come from many different sources and are displayed on many different types of displays under many different conditions, the video image on the display may not always have the desired appearance. The user-adjustable image processing parameters are adjusted to compensate for the variations in source, display and viewing conditions.

The user-adjustable image processing parameter are used in the video image processing unit to adjust the pixel properties (color, intensity etc.) for the image in a fashion corresponding to the value of the particularly parameter. These parameters preferably include brightness, contrast, hue, saturation and sharpness, among others. By way of example, if the parameter is brightness, which might have a range of 0 to 100, the image processor would scale the pixel intensities corresponding to the brightness value. Specifically, if 50 represents a neutral brightness scaling, then the image processing unit would make no adjustment if the parameter were equal to 50. On the other hand if the value was 75 the image processing unit would scale up the intensity of each of the pixels so that the image as a whole looked brighter. Each of the various parameters has a corresponding modification function that the image processing unit applies during processing. The parameter values themselves thus represent a scale factor for incorporation into a particular modification function. The modification functions are well known in the art and not directly relevant to the present invention.

System 10 includes a user input mechanism 20 connected to the image processing unit to allow a user to adjust the various image processing parameters. The user input mechanism typically takes the form of one or more knobs that a user can turn to adjust the user-adjustable parameters, a set of push-buttons on the video display, or a hand-held remote control device, although other types of input mechanism could be used as well.

Video display 12 is shown in greater detail in FIG. 2. Display 12 has a display surface area 22 over which the video image is to be displayed. During normal operation, the image processing unit controls the appearance of the video image by utilizing the current or default values of the user-adjustable parameters. In normal operation, the same value of the user-adjustable parameters is used for processing the entire video signal for display over the entire display surface area.

Image processing unit 14 also has an adjustment mode, as illustrated in FIG. 2, in which at least one of the user-adjustable parameters is not constant over the display surface area. In the adjustment mode, display surface area 22 is preferably divided into a current settings area 24, in which the corresponding portion of the video signal is processed utilizing the current values of a selected user-adjustable image processing parameters, and a variable area 26 over which the value of the user-adjustable image processing parameter used to process the corresponding part of the video signal is varied. Although the variable area is shown spanning the display, it should be understood that it could constitute only a small portion of the display in other embodiments.

A particular embodiment of the variable area is illustrated in FIG. 3, where adjacent bands or regions of pixels (shown as squares) over the variable area of the display surface area are processed with an incrementally changing user-adjustable image processing parameter. For instance, in the variable area depicted in FIG. 3, the bands are adjacent columns 28 of pixels and the parameter is brightness, which varies from 0 at the left edge of the variable area to 100 at the right edge of the area. Thus, the left most column is processed using a brightness value of 0, the adjacent column is processed using a brightness value of 1, and so on, until the rightmost column is processed with a brightness value of 100.

Although the above description recites use of a large series of parameter values across the variable area to give a relatively smooth and continuous change, the present invention could also be implemented with a series of as few as three parameter values. In particular, the variable area could be implemented with a first region processed with a first parameter value, a middle region processed with a middle parameter value (preferably the current value) and a last region processed with a last parameter value. The three parameter values preferably span the present or current value to thereby illustrate what the image looks like processed with a higher value of the parameter and what the image looks like processed with a lower value of the parameter. Although there would be some value to providing a series of values all larger or smaller than the current value, this is not preferred because the user cannot see directly the effect of a parameter change in either direction.

Because most displays have more columns than different parameter values, the bands typically consist of several columns each. Preferably, a marker corresponding to the currently selected value of the parameter is superimposed over the image in the variable area. The marker (often a number) could be displayed at a location corresponding to the current value, i.e. it could move across the screen as the user changes the current value, or it could be stationary in a predetermined location of the screen.

More generally, the above-described process may be carried out on a parameter P that has a range of $p_{min}$ to $p_{max}$ over columns $c_{min}$ to $c_{max}$. The value of P for a particular column $c_i$ would be given by the expression (where i is the column):

$$P_i = p_{min} + (p_{max} - p_{min})(i - c_{min})/(c_{max} - c_{min}).$$

For a digital system, the parameter will typically be an integer and the above equation will therefore be computed in integer arithmetic.

While the above equation illustrates a linear gradation of image processing parameter, other non-linear functions could, of course, be used as well. For instance, because human visual processing is not linear due to lateral inhibition and other effects, it may be desirable to compensate for these irregularities by altering the gradation pattern or separating regions of the screen by sections of solid color.

The result of the above-described processing is a variable area that presents a smoothly gradated display demonstrating the effect of changing the particular parameter on the video image. By presenting the portion of the image processed with the current value of the processing parameter together with the variable area, the user is able to compare the image processed under the current setting with image process with parameter values is either direction. This allows the user to evaluate the effect that an adjustment of the parameter in either direction would have on the image relative to its present appearance. Thus, the user is able to see the effect of a change prospectively prior to actually making the change. This is in contrast to existing systems which only show the effect retrospectively, or after the change has been made. When the user makes a change in the chosen image processing parameter, the image processing unit updates the video image on the display using the newly-selected image processing parameter in the current settings area. It should be understood that the video image is typically constantly changing as the sequential video frames are displayed at a rate of approximately 30 frames per second. Thus, the reference to updating the video image using the newly-selected image processing parameter, has to do with the processing applied to the video signal not with simply the ongoing evolution of the motion captured in the video signal.

Figure 4:
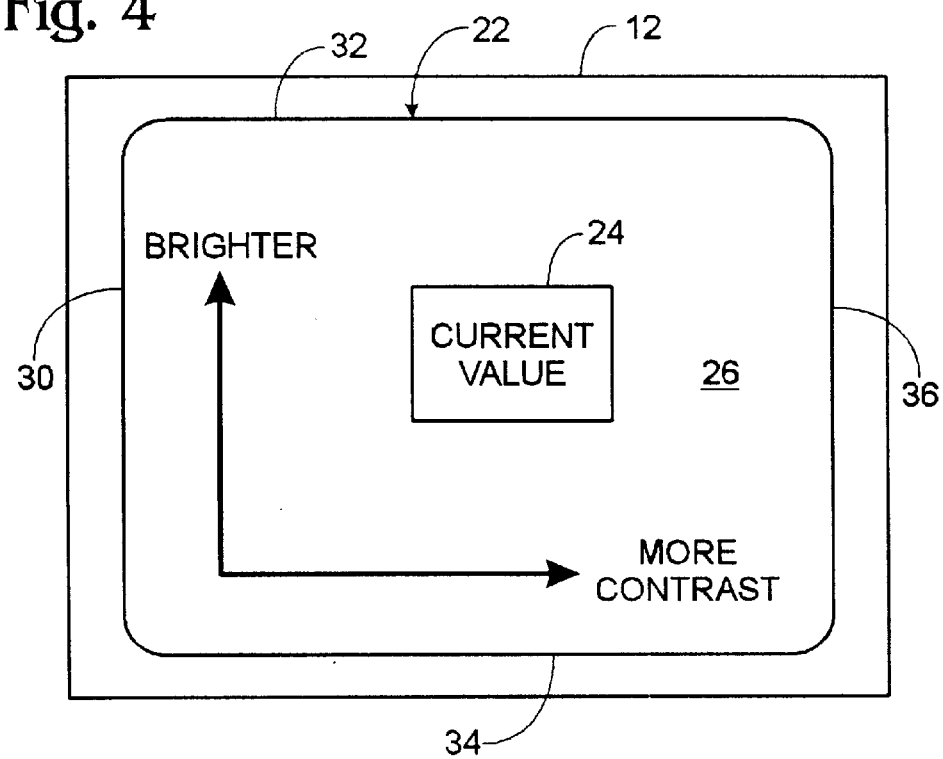
FIG. 4 shows an alternate embodiment of the display of FIG. 2 in which the video image is processed with two gradated image processing parameters in two different directions.

The above-described gradation could be applied in any direction across the screen including vertically, horizontally or diagonally. The variable area also could be split into two separate regions, disposed on opposite sides of the current settings area. Moreover, the gradation could be applied to two parameters simultaneously in different directions. For example, as shown in FIG. 4, it is possible to display brightness gradated horizontally across the variable area between first and second edges 30 32, respectively, with contrast gradated vertically between third and fourth edges 34 36, respectively, in the same area. A user thus would be able to see the individual and combined effects of changing either of two different parameters.

It should also be understood that the above system could be implemented with separate variable areas for two or more of the user-adjustable parameters. For instance, a stripe at the bottom of the screen might illustrate the effect of changing brightness. Another stripe placed just above might illustrate the effect of changing contrast, and so on. The adjacent stripes might also be used to illustrate different ranges of the same parameter. For instance, the contrast might have allowable values between 0 and 100. One stripe might be prepared with contrasts between 40 and 60 while the next might show contrast over the range of 25 to 75. The current value of each of the parameters would preferably be printed in the stripe or indicated by some marker placed in the stripe at a horizontal location corresponding to the current value. Although it is preferable that an area of the display be used to display a portion of the image processed with the current settings as well, this is not absolutely necessary.

In another variation, the above-described system could be implemented with current settings area 24 displayed as a small floating box superimposed over the location of the variable area corresponding to the current value of the particular parameter. See FIG. 4. In this embodiment, the location of the current settings box would be indicative of the current value of the parameter being adjusted. If the box were implemented with the two-parameter gradation, its vertical and horizontal position would represent the value of both parameters. The image in the box could correspond to the underlying portion of the video image or a fixed part of the image. Similarly, the box could be stationary, for instance at the center of the display, and the parameter gradation could shift underneath upon adjustment of the parameter.

As alluded to above, the present invention is most easily implemented in a digital television or display. In a digital display, the video signal and final video image both exist as a set of matrices of integer pixel values for luminance and color differences, or red, green and blue color values. The image processing parameters control how the signal matrices are transformed into the image matrices. The requirement that different pixels in the same video frame be transformed differently to create the variable area of the present invention is much easier to accomplish in a digital system where each pixel can be handled separately.

It will now be clear that an improvement in this art has been provided which accomplishes the objectives set forth above. While the invention has been disclosed in its preferred form, it is to be understood that the specific embodiments which have been depicted and described are not to be considered in a limited sense because there may be other forms which should also be construed to come within the scope of the appended claims.

I claim:

1. A method of processing a video signal for viewing as a video image on a display where the appearance of the video image on the display is dependent on the value of a user-adjustable image processing parameter which is used in processing the video signal for viewing as the video image on the display, the method comprising the steps of:

processing a first portion of the video signal to create a first video image portion for viewing on a corresponding first part of the display using a current value of a user-adjustable image processing parameter;

presenting the first video image portion for viewing on the first part of the display;

processing a second portion of the video signal to create a second video image portion for viewing on a corresponding second part of the display, where the value of the user-adjustable image processing parameter used in processing the second portion of the video signal is varied from a minimum at a first edge of the second video image portion to a maximum at an opposed second edge of the second video image portion; and presenting the second video image portion for viewing on the second part of the display to thereby illustrate the effect that changing the user-adjustable image processing parameter has on the video image.

2. The method of claim 1, wherein the user-adjustable image processing parameter is chosen from the group consisting of brightness, contrast, hue, saturation, gamma and sharpness.

3. The method of claim 1, wherein there is a second user-adjustable image processing parameter used in processing the second portion of the video signal, and, in the step of processing the second portion of the video signal, the value of the second user-adjustable image processing parameter is varied from a minimum at a third edge of the video image to a maximum at an opposed fourth edge of the video image, with the third and fourth edges being generally transversely oriented to the first and second edges.

4. The method of claim 3, wherein the user-adjustable image processing parameters are chosen from the group consisting of brightness, contrast, hue, saturation, gamma and sharpness.

5. The method of claim 1, further including the step of allowing a user to adjust the current value, followed by the step of superimposing the first video image portion using the adjusted current value, so that the user is able to see the effect that the adjustment change had on the video image.

6. The method of claim 1, wherein the second video image covers only a portion of the display.

7. The method of claim 1, wherein the first portion of the video signal is processed using a current value of a second user-adjustable image processing parameter and further including the steps of:

processing a third portion of the video signal to create a third video image portion for viewing on a corresponding third part of the display, where the value of the second user-adjustable image processing parameter used in processing the third portion of the video signal is varied from a minimum at a first edge of the third video image portion to a maximum at an opposed second edge of the third video image portion; and presenting the third video image portion for viewing on the third part of the display to thereby illustrate the effect that changing the second user-adjustable image processing parameter has on the video image.

8. A method of processing a video signal for viewing as a video image on a display where the appearance of the video image on the display is dependent on the value of a user-adjustable image processing parameter which is used in processing the video signal for viewing as the video image on the display, the method comprising the steps of:

processing a selected portion of the video signal to create a first video image portion for viewing on a corresponding selected first part of the display using a first value of a user-adjustable image processing parameter;

processing a second selected portion of the video signal to create a second video image portion for viewing on a corresponding selected second pail of the display using a second value of the user-adjustable image processing parameter; and processing a third selected portion of the video signal to create a third video image portion for viewing on a corresponding selected third part of the display using a third value of the user-adjustable image processing parameter;

where the first, second and third parts of the display are disposed in sequence adjacent to each other and the first, second and third values are likewise ordered in sequence.

9. The method of claim 8, further including the step of processing for multiple selected portions of the video signal to create multiple video image portions for viewing on corresponding selected multiple parts of the display using multiple values of the user-adjustable image processing parameter, where the multiple parts of the display are disposed in sequence adjacent to each other and the multiple values are likewise ordered in sequence to create a relatively smooth gradation of user-adjustable image processing parameters over the display.

10. The method of claim 9, wherein the multiple parts of the display comprise sequential, adjacent bands of pixels.

11. The method of claim 9, wherein the user-adjustable image processing parameter has an allowable range of values and the multiple values span the entire range.

12. The method of claim 9, wherein the gradation of user-adjustable image processing parameters across the multiple parts of the display is linear.

13. The method of claim 9, further including the step of displaying a marker on the display corresponding to one of the multiple values corresponding to a current value of the user-adjustable parameter.

14. The method of claim 8, wherein the second value is a current value of the user-adjustable image processing parameter, whereby a user is shown the effect of increasing and decreasing the user-adjustable image processing parameter.

15. A video system comprising:
a video display adapted to display a video image composed of a multiplicity of pixels;
a video image processing unit adapted to receive a video signal including pixel data values, the video image processing unit being connected to the video display to process the video signal utilizing at least one user-adjustable image processing parameter to create a video image for display on the video display, the appearance of the video image being dependent on the value of the at least one user-adjustable image processing parameter, the image processing unit further including a first operational mode in which a current value of the at least one user-adjustable image processing parameter is utilized to process the entire video signal, and an adjustment mode in which different parts of the video image are processed with different values of the user-adjustable image processing parameter, the different parts including at least a first part that is processed utilizing a first user-adjustable image processing parameter, a second part utilizing a second user-adjustable image processing parameter and a third part utilizing a third user-adjustable image processing parameter, where first, second and third values are sequential and one of the values is equal to the current value, whereby a user can simultaneously see a portion of the image processed with the current value as well as the effect of changing the current value on the image; and
a user input apparatus operatively connected to the video image processing unit and configured to allow the user to selectively change the video image processing unit between the operational mode and the adjustment mode and further allowing the user to adjust the current value of the image processing parameter when the video image processor is in the adjustment mode.

16. The system of claim 15, wherein, in the adjustment mode, there are numerous different parts of the video image processed with numerous different values of the user-adjustable image processing parameter and the different parts are arranged in a series in a first direction over the display to create a relatively smooth gradation of the changes in the user-adjustable image processing parameter.

17. An image parameter adjustment system for use with a video display having a display surface area, the system comprising:
a video image processing unit connected to the video display and adapted to control the appearance of a video image displayed on the video display, the video image being derived from a video signal external to the video image processing unit, with the appearance of the video image being controlled, in part, by the value of at least one user-adjustable display parameter, the video image processing unit including an adjustment mode in which the image processing unit is configured to control the appearance of the video image by varying, over the display surface area, the value of the user-adjustable parameter in a range around a current value so that a viewer can see the effect that changing the value of the adjustable parameter would have on the displayed video image.

18. The system of claim 17, wherein the video image processor is configured to vary the user-adjustable parameter to create a smooth gradation over the display surface area.

19. The system of claim 17, wherein the user-adjustable image processing parameter is chosen from the group consisting of brightness, contrast, hue, saturation, gamma and sharpness.

20. The system of claim 17, wherein the video image processing unit is adapted to control the appearance, in part, based on the value of a second user-adjustable display parameter, and, in the adjustment mode, the image processing unit is configured to control the appearance of the video image by varying, over the display surface area, the value of the second user-adjustable parameter in a range around a current value so that a viewer can see the effect that changing the value of either adjustable parameter would have on the displayed video image.

21. The system of claim 20, wherein the user-adjustable image processing parameters are chosen from the group consisting of brightness, contrast, hue, saturation, gamma and sharpness.

22. The system of claim 17, further including a user input mechanism coupled to the image processing unit to allow the user to selectively put the processing unit into the adjustment mode and to adjust the value of the user-adjustable image processing parameter.

23. A video display system comprising:
a video display adapted to display a video image;
a video image processing unit connected to the video display and configured to control the appearance of the video image on the video display dependent on the value of at least one use-adjustable display parameter, the video image processor further being configured to utilize a current value of the adjustable parameter to control the appearance of the video image on a first region of the video display while simultaneously utilizing a range of adjustable parameter values from a minimum value to a maximum value to control the appearance of the video image over a second region of the video display, the range of adjustable parameter values being utilized in sequence in a first direction across the second region of the screen so that a viewer can see the effect that changing the value of the adjustable parameter would have on the displayed video image.

24. A method of adjusting an image processing parameter in a video system, the method comprising:

providing a video device configured to process a video signal to generate a video image for display on a video display, the processing of the video signal being dependent on the value of a user-adjustable image processing parameter which affects the appearance of the video image, where the parameter has a current value;

displaying on a first area of the video display a corresponding predetermined first portion of the video image processed with the current value of the user-adjustable image processing parameter;

displaying on a second area of the video display a corresponding predetermined second portion of the video image processed with a second value of the user adjustable image processing parameter, where the second value of the user-adjustable image processing parameter is different than the current value and the first and second areas are displayed simultaneously to provide a user with a visual indication of the affect that changing the current value would have on the appearance of the video image.

25. The method of claim 24, further including the step of displaying on a third area of the video display a corresponding predetermined third portion of the video image processed with a third value of the user-adjustable image processing parameter, where the current value of the user-adjustable image processing parameter lies between the second and third values and the first, second and third areas are displayed simultaneously to provide a user with a visual indication of the affects of increasing and decreasing the current value on the appearance of the video image.

26. The method of claim 25, further including the step of adjusting the current value by the user.

27. The method of claim 25, wherein the first, second and third areas of the display comprise sequential, adjacent bands of pixels.

* * * * *